US012246844B1

(12) United States Patent
Weaver et al.

(10) Patent No.: US 12,246,844 B1
(45) Date of Patent: Mar. 11, 2025

(54) HYBRID AIRCRAFT POWER PLANT

(71) Applicant: PRATT & WHITNEY CANADA CORP., Longueuil (CA)

(72) Inventors: Paul Weaver, Chateauguay (CA); Bruno Chatelois, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/522,393

(22) Filed: Nov. 29, 2023

(51) Int. Cl.
*B64D 27/33* (2024.01)
*F01D 25/30* (2006.01)

(52) U.S. Cl.
CPC ............. *B64D 27/33* (2024.01); *F01D 25/30* (2013.01); *F05D 2220/323* (2013.01)

(58) Field of Classification Search
CPC ...... B64D 33/04; B64D 27/33; B64D 27/026; F05D 2220/323; F05D 2220/76; F05D 2220/324; F05D 2220/327; F01D 15/10; F02C 7/32; B60L 50/10
See application file for complete search history.

(56) References Cited

U.S. PATENT DOCUMENTS

| | | | |
|---|---|---|---|
| 3,374,849 A | 3/1968 | Redman | |
| 3,556,239 A | 1/1971 | Spahn | |
| 7,967,219 B1* | 6/2011 | Taylor | B64C 29/0066 239/265.19 |
| 9,969,500 B2* | 5/2018 | Anderson | B64D 33/04 |
| 10,267,263 B2 | 4/2019 | Lord et al. | |
| 10,823,056 B2 | 11/2020 | Suciu et al. | |
| 2004/0187476 A1* | 9/2004 | Lair | F02K 1/1207 60/770 |
| 2011/0154827 A1* | 6/2011 | Ress, Jr. | F02C 7/32 60/39.15 |
| 2015/0218967 A1* | 8/2015 | Anderson | F01D 25/30 137/561 A |
| 2019/0017438 A1* | 1/2019 | Miller | F02C 7/32 |
| 2021/0107676 A1* | 4/2021 | Sibbach | F02C 7/32 |
| 2022/0128004 A1* | 4/2022 | Muldoon | F02C 7/12 |
| 2022/0302801 A1* | 9/2022 | Osama | H02K 11/02 |
| 2023/0139190 A1* | 5/2023 | Amari | B64D 31/06 244/62 |
| 2024/0084732 A1* | 3/2024 | Kilchyk | F02C 6/20 |

FOREIGN PATENT DOCUMENTS

| | | | | |
|---|---|---|---|---|
| CN | 112644716 A | * | 4/2021 | ............ B64D 15/04 |
| EP | 3290659 A1 | * | 3/2018 | ............ B64D 29/00 |
| EP | 3992082 A1 | * | 5/2022 | ............ B64D 13/02 |
| EP | 4310309 A1 | * | 1/2024 | ............ B64D 27/02 |
| GB | 2305976 A | * | 4/1997 | ............... F02K 3/02 |

* cited by examiner

Primary Examiner — Craig Kim
(74) Attorney, Agent, or Firm — Norton Rose Fulbright Canada LLP (57) ABSTRACT

A hybrid aircraft power plant includes an air mover for propelling an aircraft, a gas turbine engine operable to drive the air mover, a bifurcated exhaust duct conveying combustion gas from the gas turbine engine, and an electric motor mounted to the exhaust duct and operable to drive the air mover. The turbine engine includes a turbine extracting energy from an annular stream of the combustion gas and being rotatable about a rotation axis. The exhaust duct includes a first branch conveying a first portion of the combustion gas toward a first direction away from a rotation axis of the turbine, and a second branch conveying a second portion of the combustion gas toward a second direction away from the rotation axis.

17 Claims, 8 Drawing Sheets

HYBRID AIRCRAFT POWER PLANT

TECHNICAL FIELD

The disclosure relates generally to aircraft power plants, and more particularly to architectures of hybrid aircraft power plants.

BACKGROUND

Hybrid aircraft power plants that include a heat engine and an electric motor for propelling aircraft can provide operational advantages. However, the implementation of hybrid aircraft power plants can be challenging and can result in system architectures that are complex and bulky. Improvement is desirable.

SUMMARY

In one aspect, the disclosure describes a hybrid aircraft power plant comprising:
  an air mover for propelling an aircraft;
  a gas turbine engine operable to drive the air mover, the gas turbine engine including:
  a turbine extracting energy from an annular stream of combustion gas, the turbine being rotatable about a rotation axis;
  a bifurcated exhaust duct receiving the annular stream of the combustion gas from the turbine, the bifurcated exhaust duct including: a first branch conveying a first portion of the combustion gas toward a first direction away from the rotation axis of the turbine; and a second branch conveying a second portion of the combustion gas toward a second direction away from the rotation axis, the second direction being different from the first direction; and
  an electric motor mounted to the bifurcated exhaust duct and operable to drive the air mover via the turbine.

The electric motor may be mounted to the bifurcated exhaust duct at a mounting location between the first branch and the second branch.

The electric motor may include a rotor rotatable about the rotation axis of the turbine.

The bifurcated exhaust duct may be at least partially double-walled and may include: an inner wall conveying the combustion gas; and an outer wall disposed outwardly of the inner wall. The electric motor may be mounted to the outer wall.

The outer wall may define a mounting interface for the electric motor. The mounting interface may define a socket receiving part of the electric motor.

The outer wall may define a mounting interface for the electric motor. The electric motor may be fastened to the mounting interface.

The first branch and the second branch may be at diametrically opposed positions relative to the rotation axis of the turbine.

The bifurcated exhaust duct may include: an inner wall defining the first branch and the second branch; and an outer wall disposed outwardly of the inner wall. The first branch may extend through a first opening formed through the outer wall. The second branch may extend through a second opening formed through the outer wall.

The first opening through the outer wall and the second opening through the outer wall may be diametrically opposed relative to the rotation axis of the turbine.

The first opening through the outer wall and the second opening through the outer wall may be non-diametrically opposed relative to the rotation axis of the turbine.

The first branch of the inner wall and the first opening through the outer wall may be sized to define a gap between the first branch and the first opening. The gap may extend completely around the first branch.

The first branch may be engaged with the outer wall at the first opening. The second branch may be engaged with the outer wall at the second opening.

The outer wall may define a mounting interface for the electric motor. The mounting interface may be disposed between the first branch and the second branch. The electric motor may be fastened to the mounting interface. The electric motor may be coaxial with the rotation axis of the turbine.

The electric motor may be mounted between the first branch and the second branch. The electric motor may be coaxial with the turbine. The electric motor may be in torque-transmitting engagement with the turbine via a shaft that is coaxial with the turbine.

Embodiments may include combinations of the above features.

In another aspect, the disclosure describes an aircraft power plant for propelling an aircraft. The aircraft power plant comprises:
  a propeller for propelling the aircraft;
  a compressor for pressurizing air;
  a combustor in which the pressurised air is mixed with fuel and ignited for generating combustion gas;
  a turbine for extracting energy from combustion gas, the turbine being in torque-transmitting engagement with the propeller;
  a bifurcated exhaust duct for receiving the combustion gas from the turbine, the bifurcated exhaust duct including: a first branch for conveying a first portion of the combustion gas; and a second branch for conveying a second portion of the combustion gas; and
  an electric machine mounted to the bifurcated exhaust duct and in torque-transmitting engagement with the turbine.

The electric machine may be mounted between the first branch and the second branch. The electric machine may be coaxial with the turbine.

The bifurcated exhaust duct may include: an inner wall defining the first branch and the second branch; and an outer wall covering part of the inner wall. The first branch and the second branch may extend through the outer wall. The electric machine may be mounted to the outer wall.

The electric machine may be in torque-transmitting engagement with the turbine via a shaft that is coaxial with the turbine.

Embodiments may include combinations of the above features.

In a further aspect, the disclosure describes a method for operating a hybrid power plant of an aircraft. The method comprises:
  extracting energy from combustion gas using a turbine;
  driving an air mover with the turbine to propel the aircraft;
  receiving the combustion gas from the turbine in a bifurcated exhaust duct;
  conveying a first portion of the combustion gas in a first branch of the bifurcated exhaust duct;
  conveying a second portion of the combustion gas in a second branch of
  the bifurcated exhaust duct; and driving the air mover with an electric motor mounted to the bifurcated exhaust duct.

The electric motor may be coaxial with the turbine. Driving the air mover with the electric motor may include driving the turbine with the electric motor.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The present disclosure relates to architectures of hybrid aircraft power plants and associated methods of operating hybrid aircraft power plants. In some embodiments, the system architectures described herein may facilitate the adaptation of existing gas turbine engine configurations into hybrid power plants. In some embodiments, the system architectures described herein may facilitate the integration of a turboprop gas turbine engine into a hybrid electric aircraft power plant. For example, a bifurcated exhaust duct may be installed on the gas turbine engine to facilitate the installation of an electric motor configured to assist with the propulsion of the aircraft. The electric motor may be mounted directly to the bifurcated exhaust duct to promote a relatively compact system architecture with efficient packaging that does not significantly impact the configuration of the gas turbine engine or the size of the nacelle that encloses the hybrid power plant.

Aspects of various embodiments are described through reference to the drawings.

The terms "connected" or "coupled to" may include both direct connection or coupling (in which two elements contact each other) and indirect connection or coupling (in which at least one additional element is located between the two elements). The term "substantially" as used herein may be applied to modify any quantitative representation which could permissibly vary without resulting in a change in the basic function to which it is related.

Figure 1:
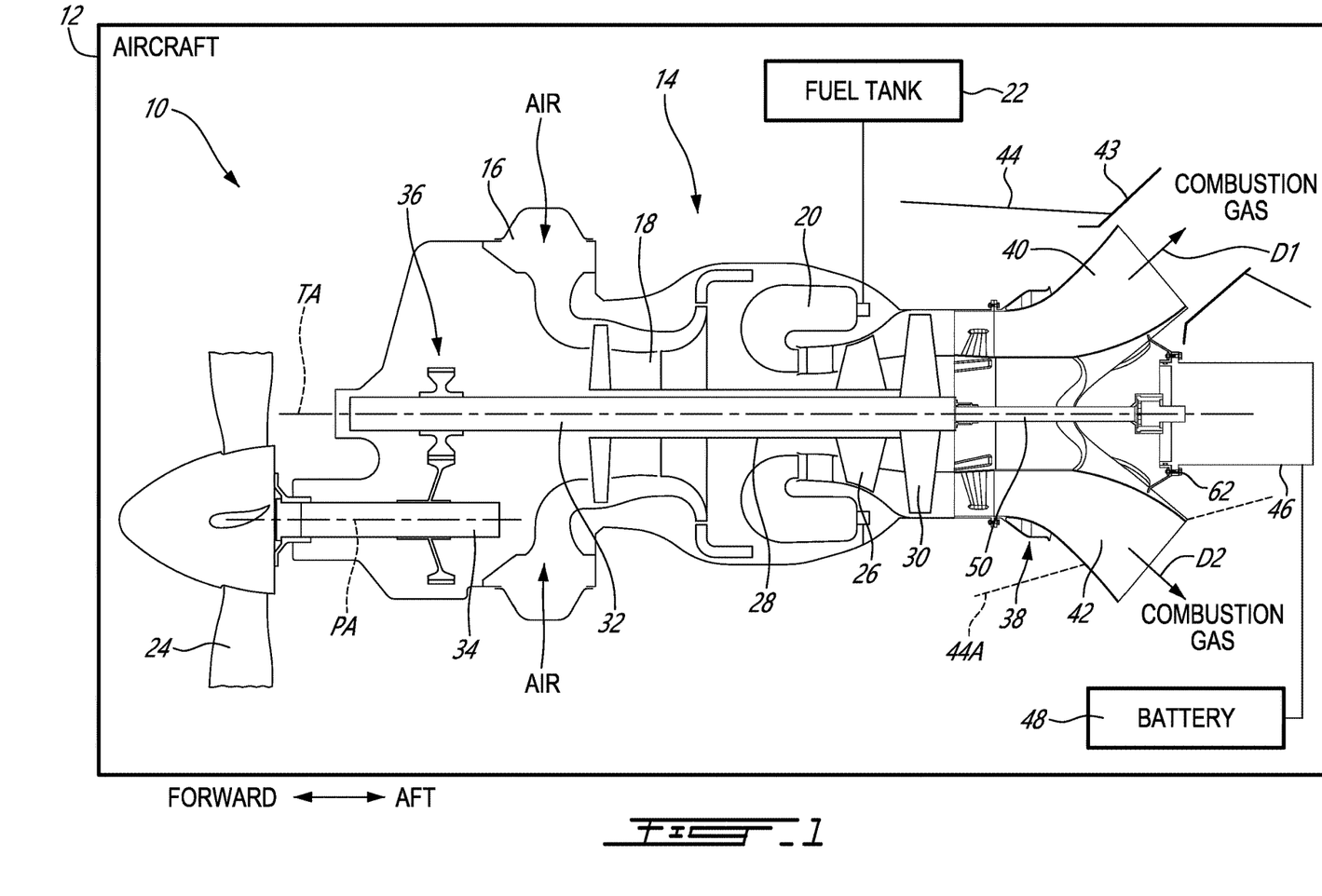
FIG. 1 is an axial cross-sectional view of a hybrid aircraft power plant including a gas turbine engine and an electric machine as described herein.

FIG. 1 is an axial cross-sectional view of hybrid aircraft power plant 10 (referred hereinafter as "power plant 10") as described herein. Power plant 10 may be used to propel aircraft 12 during one or more phases of flight of aircraft 12. In some embodiments, aircraft 12 may be a fixed wing aircraft. In various embodiments, aircraft 12 may include one or more power plants 10 for propelling aircraft 12. In some embodiments, power plant 10 may be configured for use on rotary wing aircraft (e.g., helicopter). As illustrated in FIG. 1, power plant 10 may include a turboprop gas turbine engine 14 (referred hereinafter as "engine 14") however, aspects of the present disclosure may be incorporated into turboshaft gas turbine engines as well. The forward direction shown in FIG. 1 corresponds to the usual direction of motion of power plant 10 and of aircraft 12 when power plant 10 is propelling aircraft 12 during flight for example. The aft direction shown Is the axial opposite to the forward direction.

Engine 14 may be of a type preferably provided for use in subsonic flight. Engine 14 may be a flow-through gas turbine engine where the flow of air and combustion gas through engine 14 is generally toward the aft direction (i.e., from a forward portion of engine 14 to an aft portion of engine 14). For example, engine 14 may include (e.g., radial) air inlet 16 into which ambient air is received and conveyed toward compressor 18. In some embodiments, compressor 18 may be a multistage compressor that pressurized the air received via air inlet 16. Engine 14 may include combustor 20 in which the compressed air received from compressor 18 is mixed with a combustible fuel from fuel tank 22 and ignited to generate an annular stream of hot combustion gas. Engine 14 may include a turbine section to extract energy from the combustion gas and convert the energy into motive power to drive an air mover such as propeller 24 and thereby propel aircraft 12. In various embodiments, power plant 10 may include one or more air movers suitable for propelling aircraft 12. In some embodiments, such air mover(s) may include a bladed rotor such as a fan or a variable-pitch propeller for example.

In various embodiments, engine 14 may be a single spool gas turbine engine or a multi-spool gas turbine engine. For example, engine 14 may include a high-pressure spool including one or more high-pressure turbines 26 of the turbine section, high-pressure shaft 28 and one or more stages of compressor 18. High-pressure turbine 26 may drive the rotation of the high-pressure spool.

Engine 14 may include a low-pressure spool that is separately rotatable from the high-pressure spool. In other words, the high-pressure spool and the low-pressure spool may be mechanically disconnected to permit one spool to freely rotate relative to the other. The low-pressure spool may include one or more low-pressure turbines 30, low-pressure shaft 32 and optionally one or more stages of compressor 18. In some embodiments, high-pressure shaft 28 and low-pressure shaft 32 may be coaxial where high-pressure shaft 28 may be hollow to permit the passage of low-pressure shaft 32 therethrough. Low-pressure turbine 30 may be disposed downstream of high-pressure turbine 26 relative to the gas path conveying combustion gas from combustor 20.

Low-pressure turbine 30 may drive the rotation of the low-pressure spool and may also drive the rotation of propeller 24. Low-pressure turbine 30 may be in torque-transmitting engagement with propeller 24 via low-pressure shaft 32. Low-pressure turbine 30 and low-pressure shaft 32 may be rotatable about turbine axis TA. In some embodiments, propeller 24 may be supported by propeller shaft 34, which may be in torque transmitting engagement with low-pressure shaft 32 via gear train 36. Propeller shaft 34 and propeller 24 may be rotatable about propeller axis PA, which may be parallel to and offset from turbine axis TA. In other embodiments, propeller 24 and low-pressure turbine 30 may be coaxial. In some embodiments, gear train 36 may be of a speed-reducing type so that the rotational speed of propeller shaft 34 may be lower than the rotational speed of low-pressure shaft 32 and of low-pressure turbine 30 during operation of power plant 10. Gear train 36 may be part of a speed-reducing gear box also known as a reduction gear box (RGB).

Power plant 10 may include bifurcated exhaust duct 38 (referred herein after as "exhaust duct") mounted aft of and downstream from low-pressure turbine 30. During operation of engine 14, exhaust duct 38 may receive the annular stream of combustion gas from low-pressure turbine 30, split the annular stream into two separate streams and then convey the two separate streams of combustion gas in two different general directions of flow referred herein as directions D1, D2. Directions D1 and D2 may be different (e.g., divergent, non-parallel). Directions D1 and D2 may be orientated radially outwardly from turbine axis TA. For example, directions D1 and D2 may have radially outward and aft vector components. In some embodiments, directions D1 and D2 may each be oriented at an acute angle from turbine axis TA. In some embodiments, directions D1 and D2 may each be oriented at an angle of between 30° and 60° from turbine axis TA. In some embodiments, directions D1 and D2 may each be oriented at an angle of between 40° and 50° from turbine axis TA. In some embodiments, directions D1 and D2 may each be oriented at an angle of about 45° from turbine axis TA. In some embodiments, exhaust duct 38 may include first branch 40 conveying a first portion of the combustion gas toward first direction D1 away from turbine axis TA, and second branch 42 conveying a second portion of the combustion gas toward second direction D2 away from turbine axis TA.

In some embodiments, additional duct work such as respective ejector pipes 43 (only one being shown as an example) may be in fluid communication with first branch 40 and second branch 42 of exhaust duct 38 to optionally ventilate nacelle 44 and also convey the combustion gas outside of nacelle 44. Nacelle 44 is partially shown in FIG. 1 and may envelope part of power plant 10. For example, in some embodiments, engine 14, exhaust duct 38 and electric machine 46 may be housed in nacelle 44.

Alternatively, first branch 40 and second branch 42 may convey the combustion gas directly outside of nacelle 44 without the use of ejector pipes 43. As an example, FIG. 1 shows alternate nacelle 44A in broken lines using reference numeral 44A where first branch 40 and second branch 42 may convey the combustion gas directly outside of alternate nacelle 44A without the use of ejector pipes 43. Alternate nacelle 44A is partially shown in FIG. 1 and may envelope part of power plant 10. For example, in some embodiments, engine 14, some or all of exhaust duct 38, and electric machine 46 may be housed in alternate nacelle 44A.

Electric machine 46 may be mounted to and supported by exhaust duct 38. Electric machine 46 may be disposed aft of low-pressure turbine 30. Electric machine 46 may be drivingly coupled to propeller 24 via low-pressure turbine 30 and low-pressure shaft 32. In some embodiments, electric machine 46 may be operable as an electric motor for converting electric energy into torque for driving propeller 24. In some embodiments, electric machine 46 may additionally be operable as an electric generator where mechanical energy (e.g., torque*rotational speed) is converted into electric energy. During a motoring mode of operation, electric machine 46 may receive electric energy from a suitable electric power source such as battery 48. During a generating mode of operation, electric machine 46 may receive mechanical energy from low-pressure turbine 30 and generate electric energy for charging battery 48 or powering one or more other systems of power plant 10 or of aircraft 12.

In various embodiments, engine 14 and electric machine 46 may be controlled by one or more controllers so that engine 14 and electric machine 46 may be operated either together or separately to drive propeller 24. In some embodiments, the operation of engine 14 and/or electric machine 46 may be selected based on a phase of flight of aircraft 12. For example, during a take-off phase of a fixed-wing aircraft, both engine 14 and electric machine 46 may be used to cooperatively drive propeller 24. On the other hand, in a leveled cruise phase of flight, only engine 14 may be used to drive propeller 24 in some embodiments.

Electric machine 46 may be mounted to exhaust duct 38 and be operable to drive (i.e., in torque-transmitting engagement with) propeller 24 via low-pressure turbine 30 and low-pressure shaft 32 and/or via separate torque-transmitting engagement between electric machine 46 and propeller 24. In some embodiments, electric machine 46 may be selectively or permanently drivingly coupled to low-pressure shaft 32 via coupling shaft 50. Coupling shaft 50 may be connected to low-pressure shaft 32 and to electric machine 46 via suitable splined connections or other means to establish torque transmission between low-pressure shaft 32 and electric machine 46. In embodiments where electric machine 46 is selectively connectable to low-pressure shaft 32, a releasable/engageable clutch may be operatively disposed between electric machine 46 and low-pressure shaft 32.

In some embodiments, electric machine 46 may be mounted to exhaust duct 38 at a mounting location between first branch 40 and second branch 42. For example, first branch 40 and second branch 42 may extend to opposite sides of electric machine 46. In some embodiments, electric machine 46 may be mounted to be substantially coaxial with low-pressure turbine 30 and with low-pressure shaft 32. In some embodiments, coupling shaft 50 may be rotatable about turbine axis TA and consequently be substantially coaxial with low-pressure turbine 30 and low-pressure shaft 32.

Figure 2:
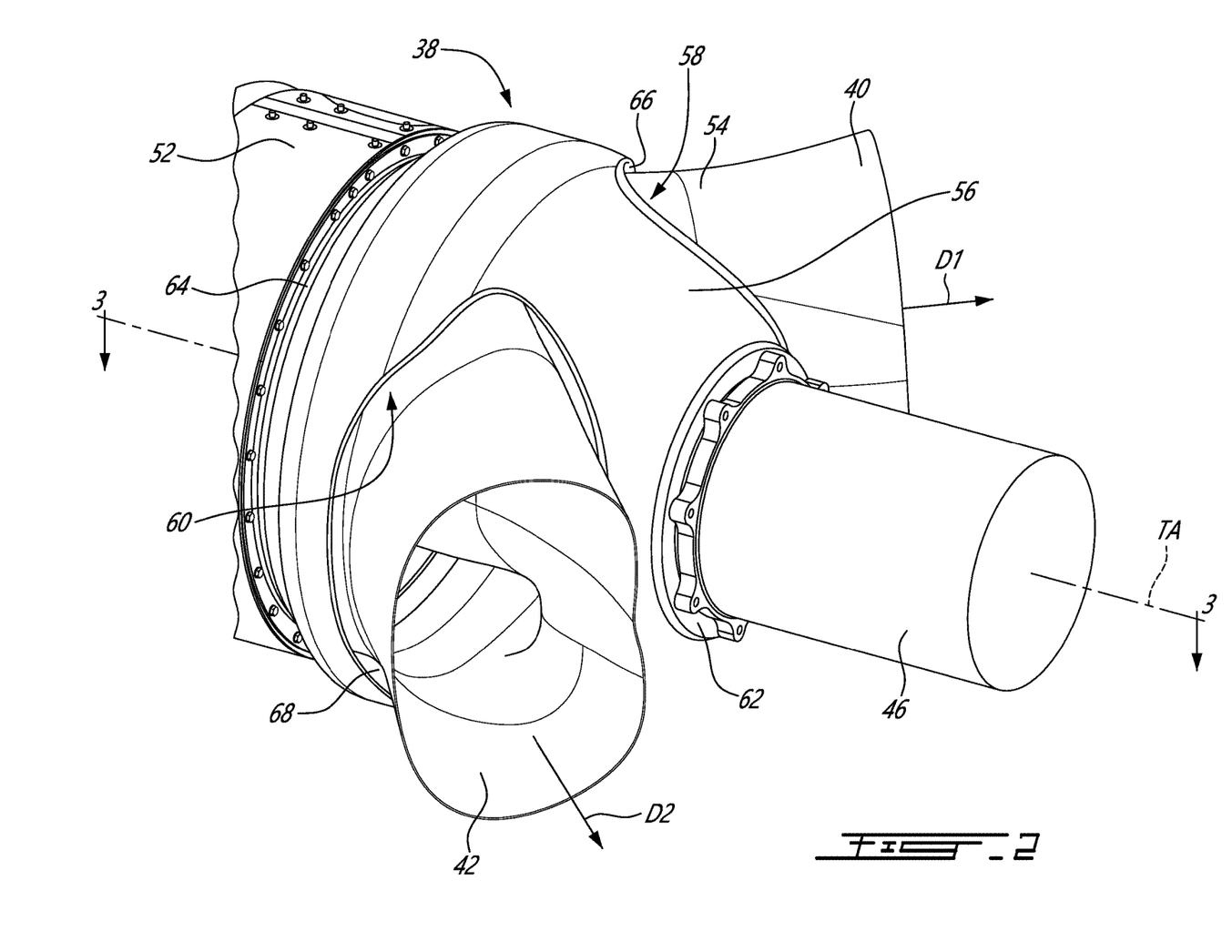
FIG. 2 is a perspective view of an exemplary aft portion of the hybrid aircraft power plant of FIG. 1 showing a bifurcated exhaust duct and an electric machine mounted to the bifurcated exhaust duct.

FIG. 2 is a perspective view of an exemplary aft portion of power plant 10 showing exhaust duct 38 and electric machine 46 mounted to exhaust duct 38. Exhaust duct 38 may be connected (e.g., fastened) to casing 52 of engine 14 as explained below in relation to FIG. 4. In various embodiments, exhaust duct 38 may have a single-walled or a double-walled construction. In an exemplary double-walled embodiment, exhaust duct 38 may include inner wall 54 and outer wall 56. Inner wall 54 may interface directly with the combustion gas and cause the annular stream of combustion gas received from low-pressure turbine 30 to be split and conveyed into first branch 40 and second branch 42. Accordingly, inner wall 54 may define first branch 40 and second branch 42.

Outer wall 56 may be dispose over (e.g., radially outwardly of) inner wall 54 and thereby cover part of inner wall 54. In some embodiments, first branch 40 and second branch 42 may extend through outer wall 56. For example, outer wall 56 may include first opening 58 extending therethrough and permitting first branch 40 to pass through outer wall 56 and extend from an interior of outer wall 56 to an exterior of outer wall 56. Outer wall 56 may also include second opening 60 extending therethrough and permitting second branch 42 to pass through outer wall 56 and extend from an interior of outer wall 56 to an exterior of outer wall 56.

Electric machine 46 may be mounted to outer wall 56 at mount 62. Mount 62 may be a mounting pad or other suitable surface(s) providing an interface for securing (e.g., fastening) electric machine 46 to outer wall 56. Outer wall 56 may extend between first branch 40 and second branch 42. Mount 62 may be defined between first branch 40 and second branch 42. Inner wall 54 and outer wall 56 of exhaust duct 38 may each be connected (e.g., welded) to ring 64. Ring 64 may be an annular member serving as a base of exhaust duct 38 that may be fastened to casing 52 of engine 14. Accordingly, elements of double-walled exhaust duct 38 may be assembled together to define a single component.

In some embodiments, inner wall 54 and outer wall 56 may be connected together via ring 64 but may otherwise be disconnected from each other to permit thermal expansion and contraction of inner wall 54 relative to outer wall 56 during start-up and shutdown of engine 14 for example. In other words, outer wall 56 may be spaced apart from inner wall 54 and float over inner wall 54 to define a gap therebetween to accommodate thermal expansion. For example, first branch 40 of inner wall 54 and first opening 58 through outer wall 56 may be sized to define first gap 66 between first branch 40 and a periphery of first opening 58. First gap 66 may extend completely around first branch 40. Similarly, second branch 42 of inner wall 54 and second opening 60 through outer wall 56 may be sized to define second gap 68 between second branch 42 and a periphery second opening 60. Second gap 68 may extend completely around second branch 42.

Exhaust duct 38 may be fabricated from a suitable metallic material using known or other sheet metal forming and joining processes. For examples, exhaust duct 38 may be fabricated from a plurality of separate pieces of sheet metal that are formed to a desired shape and subsequently joined together to define the overall shape of exhaust duct 38. In various embodiments, the separate pieces of sheet metal may be welded together or fastened together with rivets for example. In some embodiments, exhaust duct 38 may be fabricated from stainless steel or a suitable nickel-based alloy for example.

Figure 3:
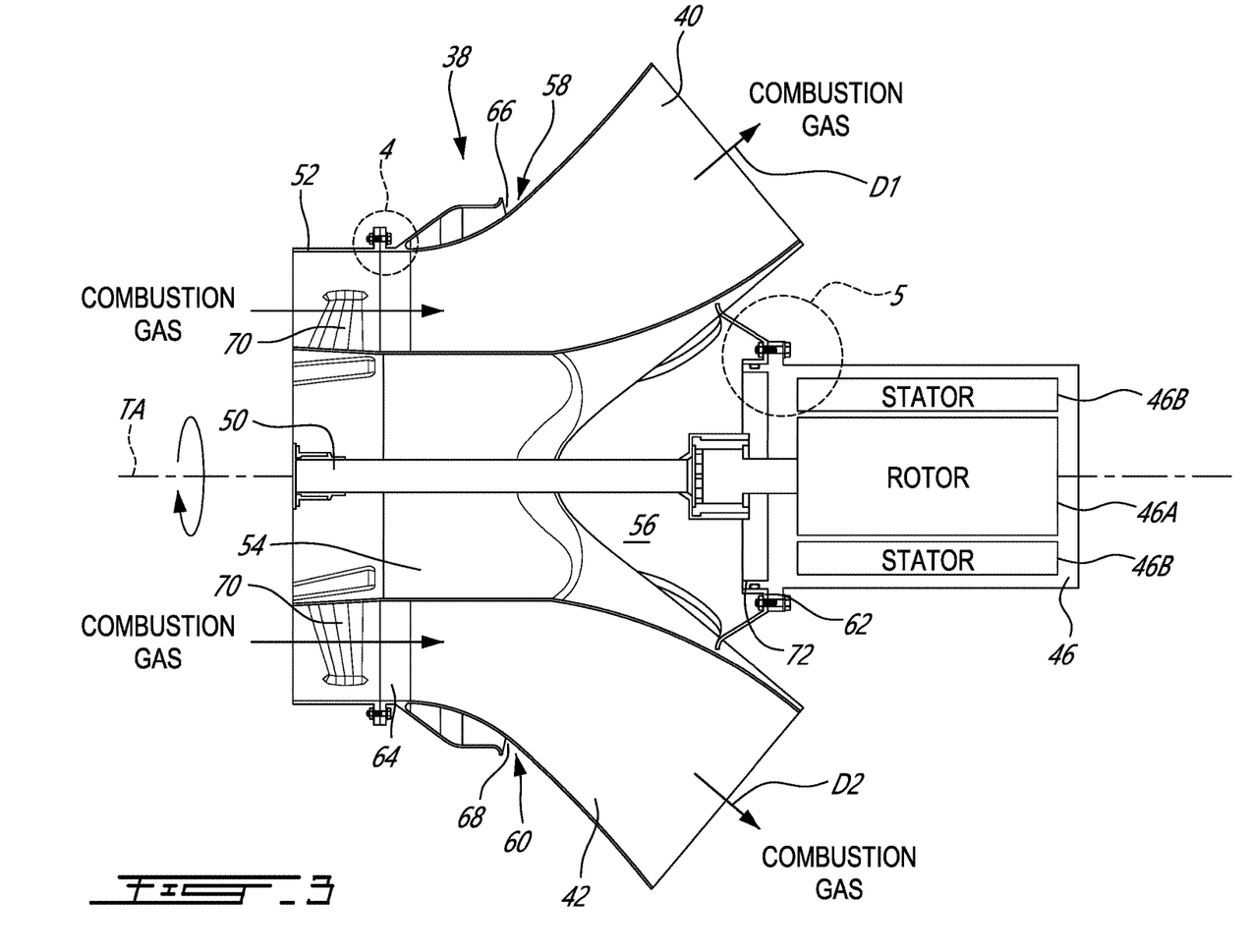
FIG. 3 is cross-sectional view of the aft portion of the hybrid aircraft power plant of FIG. 2 taken along line 3-3 in FIG. 2.

FIG. 3 is cross-sectional view of the aft portion of power plant 10 taken along line 3-3 in FIG. 2. In some embodiments, engine 14 and/or exhaust duct 38 include one or more vanes 70 for interacting with the combustion gas received from low-pressure turbine 30. Vanes 70 may serve to redirect (e.g., straighten) the flow of combustion gas. An upstream portion of exhaust duct 38 may define an annular inlet for receiving the combustion gas. The exhaust duct 38 may have a geometry that transitions the annular inlet to two separate flows oriented in diverging directions defined by first branch 40 and second branch 42.

Mount 62 defined by outer wall 56 may include socket 72 into which a forward part of electric machine 46 may be received when electric machine 46 is mounted to outer wall 56. For example, a forward portion of a housing of electric machine 46 may be received into socket 72. When mounted to outer wall 56, electric machine 46 may be coaxial with low-pressure turbine 30 and low-pressure shaft 32. For example, electric machine 46 may include rotor 46A and stator 46B. Rotor 46A may be rotatable about turbine axis TA. In other words, rotor 46A of electric machine 46 and low-pressure turbine 30 may have the same rotation axis (i.e., turbine axis TA).

Figure 4:
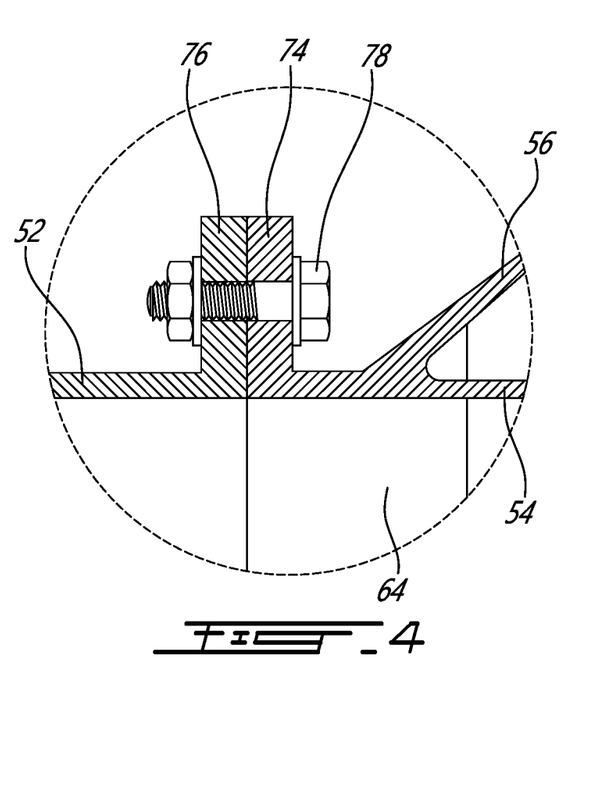
FIG. 4 is an enlarged view of region 4 in FIG. 3 showing the bifurcated exhaust duct being fastened to a casing of the gas turbine engine.

FIG. 4 is an enlarged view of region 4 in FIG. 3 showing exhaust duct 38 being fastened to casing 52 of engine 14. In some embodiments, exhaust duct 38 may be connected to casing 52 via ring 64 of exhaust duct 38. Both inner wall 54 and outer wall 56 may be connected (e.g., welded) to ring 64. For example, inner wall 54 and outer wall 56 may merge together at ring 64. Ring 64 may include duct flange 74 extending radially outwardly and may be fastened to casing flange 76 extending radially outwardly from casing 52 of engine 14. Ring 64 of exhaust duct 38 may be fastened to casing 52 via a plurality of fasteners 78 (e.g., bolts) that extend through and secure duct flange 74 and casing flange 76 together. Fasteners 78 may be angularly distributed around casing 52 and ring 64.

Figure 5:
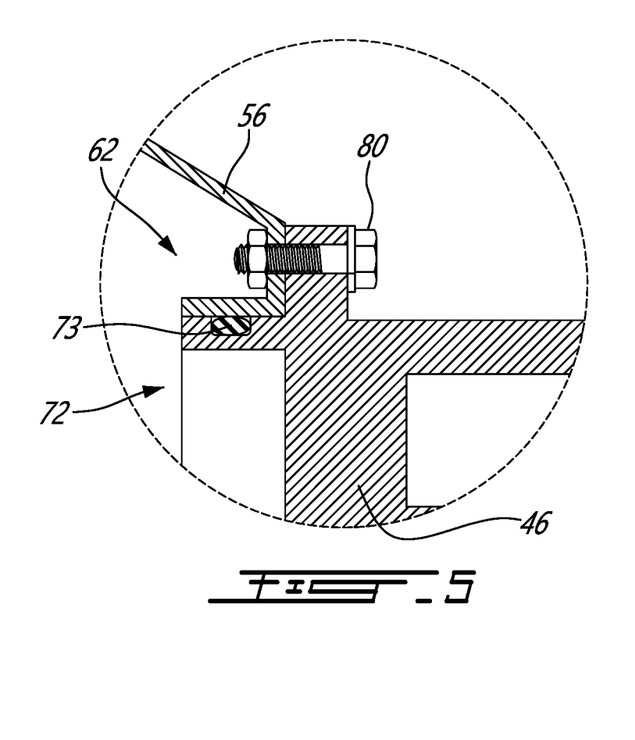
FIG. 5 is an enlarged view of region 5 in FIG. 3 showing the electric machine being fastened to the bifurcated exhaust duct.

FIG. 5 is an enlarged view of region 5 in FIG. 3 showing electric machine 46 being fastened to mount 62 defined by outer wall 56 of exhaust duct 38. Mount 62 may define a mounting interface including a plurality of fastener holes for receiving respective fasteners 80 and also socket 72 for receiving part of electric machine 46 therein. In some embodiments, socket 72 may assist in locating electric machine 46 substantially coaxially with low-pressure turbine 30. Electric machine 46 may be fastened to outer wall 56 with a plurality of fasteners 80 (e.g., bolts) that extend through outer wall 56 and through bosses formed on a housing of electric machine 46 to secure electric machine 46 to outer wall 56. In some embodiments, mount 62 of outer wall 56 may include thickened portions (pads) with threaded holes formed therein so that fasteners 80 may be threaded directly into the thickened portions. Fasteners 80 may be angularly distributed around socket 72 of mount 62. In some embodiments, the housing of electric machine 46 may be in sealing engagement with outer wall 56 via one or more gaskets or seals such as O-ring 73 for example.

Figure 6A:
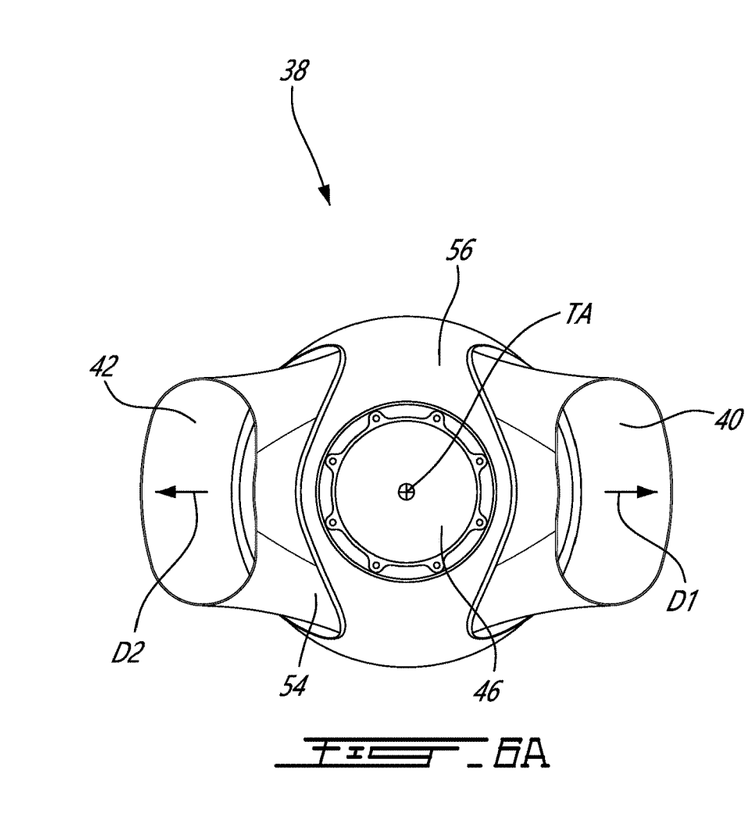
FIG. 6A is an axial end-on view in the forward direction of the aft portion of the hybrid power plant of FIG. 2.

FIG. 6A is an axial end-on view toward the forward direction of the aft portion of power plant of FIG. 2. In some embodiments, first branch 40 and second branch 42 of exhaust duct 38 may be at diametrically opposed positions relative to turbine axis TA. For example, first flow direction D1 of first branch 40 and second flow direction D2 of second branch 42 may both lie in a (e.g., horizontal) plane including turbine axis TA. In other words, first flow direction D1 of first branch 40, second flow direction D2 of second branch 42 and turbine axis TA may be substantially co-planar.

In some embodiments, first branch 40 and second branch 42 may have the same size to accommodate the same flow rate of combustion gas and may also be symmetric about a vertical plane including turbine axis TA. However, in some embodiments, first branch 40 and second branch 42 may have different sizes and be configured to accommodate different flow rates of combustion gases.

Figure 6B:
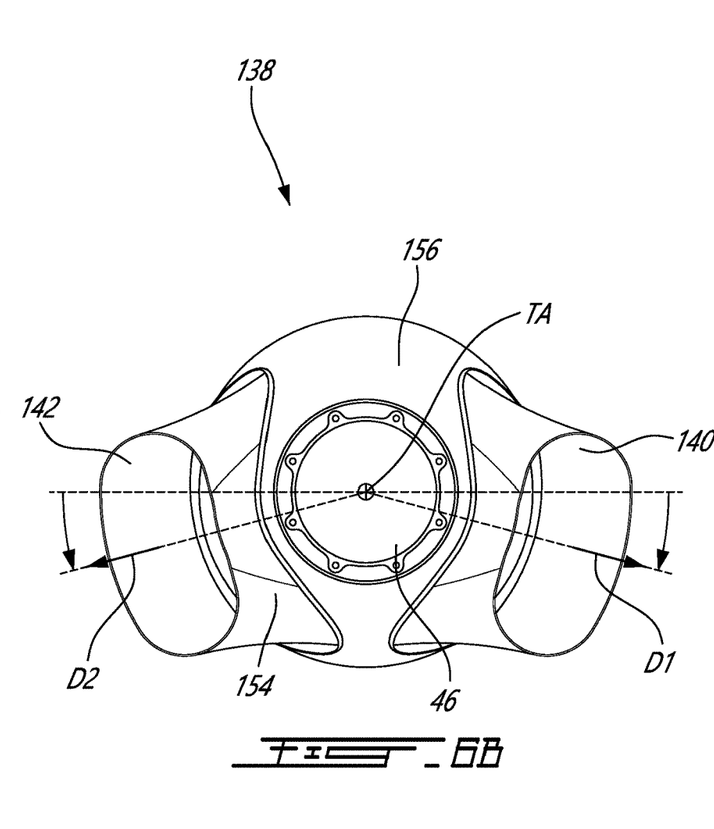
FIG. 6B is an axial end-on view in the forward direction of another exemplary aft portion of a hybrid power plant.

FIG. 6B is an axial end-on view toward the forward direction of another exemplary aft portion of a hybrid aircraft power plant. FIG. 6B shows another exemplary bifurcated exhaust duct 138 including elements of exhaust duct 38. Exhaust duct 138 may be mounted to power plant 10 to replace exhaust duct 38. Like elements are identified using reference numerals that have been incremented by 100. Exhaust duct 138 may include inner wall 154 defining first branch 140 and second branch 142. Exhaust duct 138 may also include outer wall 156. In contrast with exhaust duct 38, first branch 140 and second branch 142 of exhaust duct 138 may be clocked relative to turbine axis TA to be non-diametrically opposed relative to turbine axis TA. For example, both first branch 140 and second branch 142 may be oriented slightly downwardly as well as radially outwardly from turbine axis TA. In other words, first flow direction D1 of first branch 40, second flow direction D2 of second branch 42 and turbine axis TA may not be co-planar.

Figure 7:
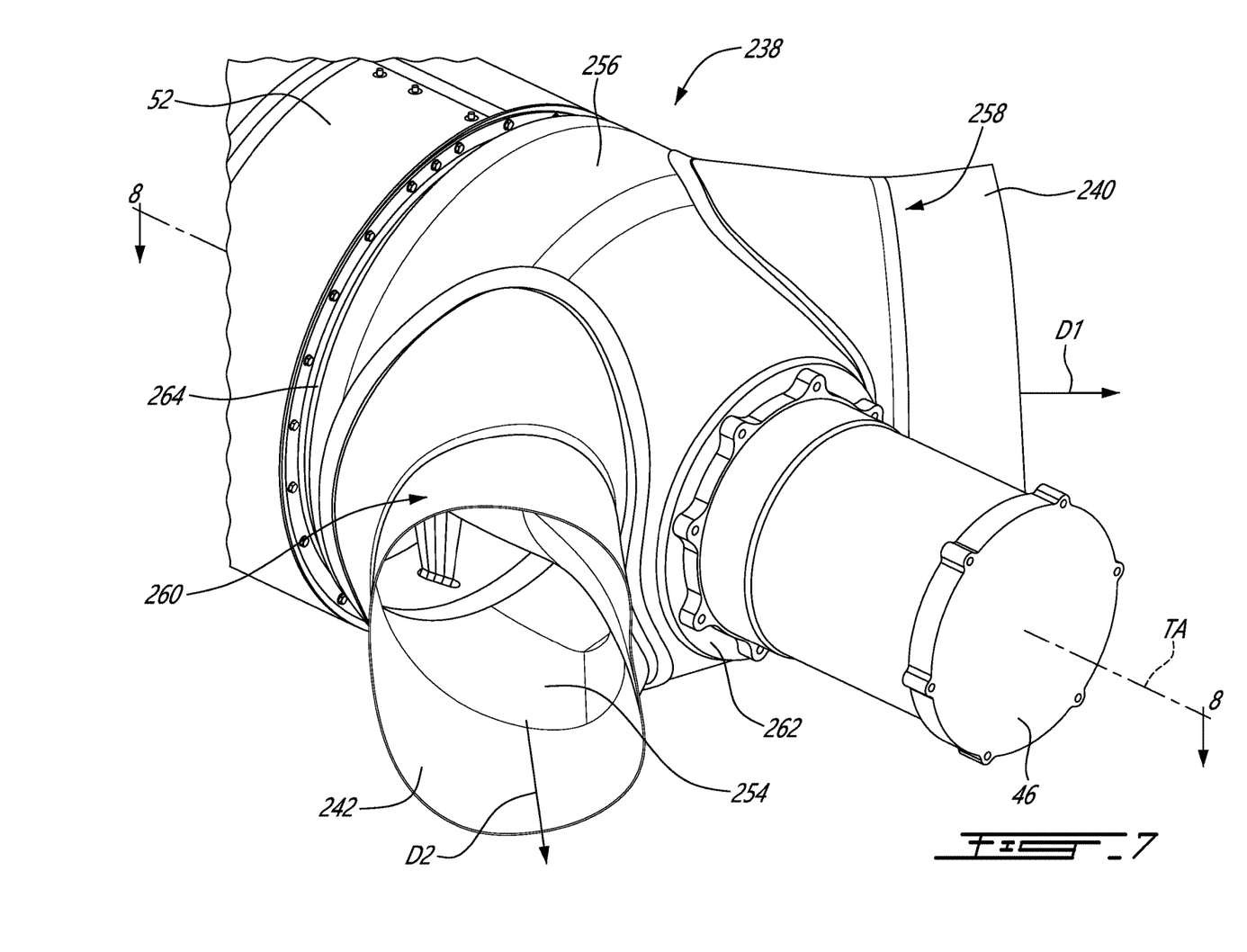
FIG. 7 is a perspective view of another exemplary aft portion of a hybrid aircraft power plant showing a bifurcated exhaust duct and an electric machine mounted to the bifurcated exhaust duct.

FIG. 7 is a perspective view of another exemplary aft portion of a hybrid aircraft power plant. FIG. 7 shows another exemplary bifurcated exhaust duct 238 including elements of exhaust ducts 38 and 138. Exhaust duct 238 may be mounted to power plant 10 to replace exhaust duct 38. Like elements are identified using reference numerals that have been incremented by 200. Exhaust duct 238 may have a double-walled construction. Exhaust duct 238 may include inner wall 254 defining first branch 240 and second branch 242. Exhaust duct 238 may also include outer wall 256 defining mount 262 to which electric machine 46 may be mounted. Exhaust duct 238 may be secured to casing 52 via ring 264. In contrast with exhaust duct 38, exhaust duct 238 may provide additional structural support for electric machine 46 by including one or more structural engagements/connections between inner wall 254 and outer wall 256 in addition to the connections at ring 264. For example, support braces may be provided between inner wall 254 and outer wall 256. Alternatively or in addition, inner wall 254 and outer wall 256 may be shaped to contact each other and define one or more load transfer paths between inner wall 254 and outer wall 256. In some embodiments, exhaust ducts 238 may have a stiffer construction than exhaust duct 38.

In some embodiments, first branch 240 of inner wall 254 may be engaged with outer wall 256 at first opening 258 through outer wall 256. Similarly, second branch 242 of inner wall 254 may be engaged with outer wall 256 at second opening 260 through outer wall 256. The engagement(s) between inner wall 254 and outer wall 256 may include welds and/or other forms of structural engagements. For example, inner wall 254 and outer wall 256 may be in direct contact with each other at one or more engagement locations.

Aspects of exhaust duct 238 may also be applied to exhaust duct 138 of FIG. 6B to provide additional structural support in embodiments where first branch 140 and second branch 142 are clocked to be non-diametrically opposed.

Figure 8:
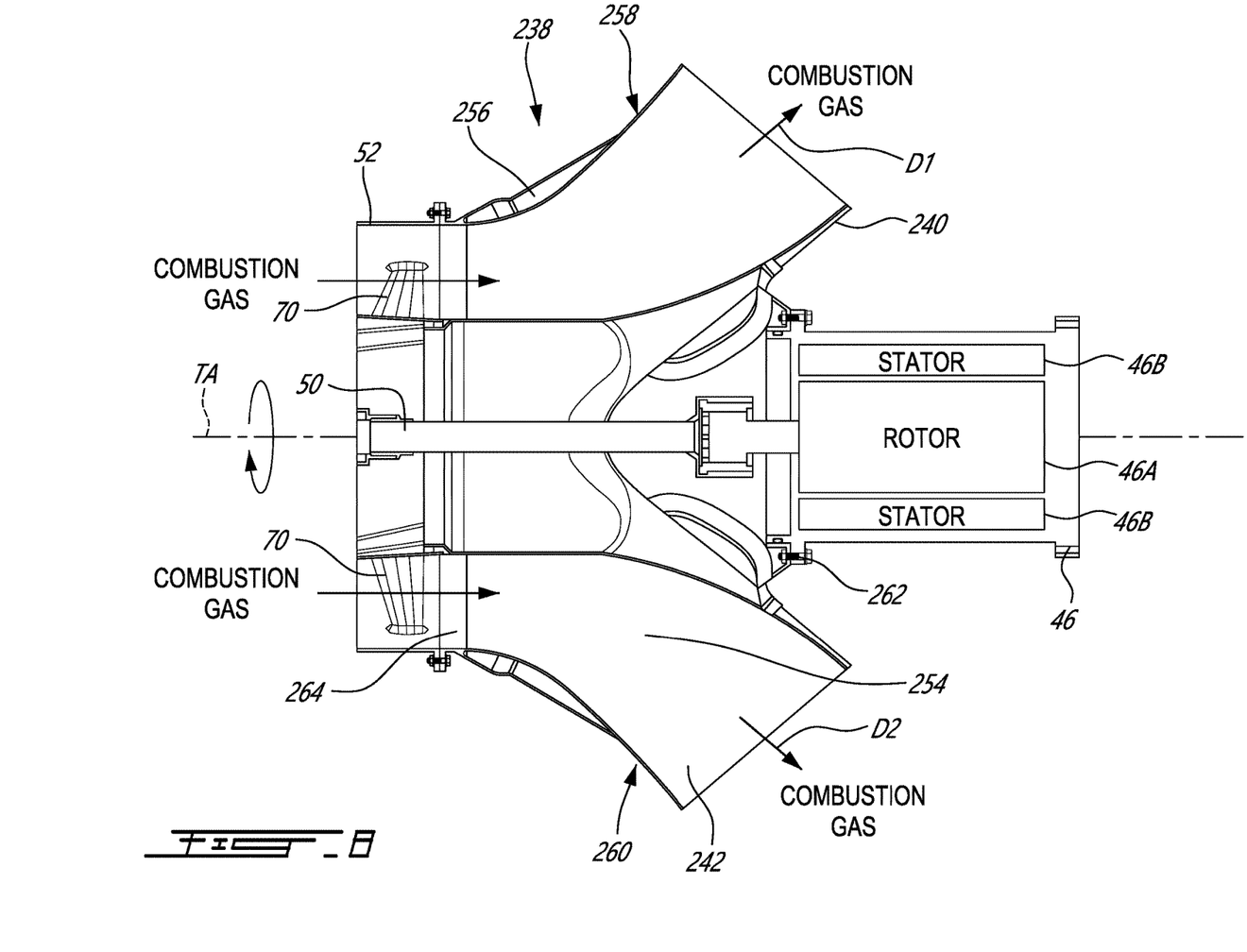
FIG. 8 is cross-sectional view of the aft portion of the hybrid aircraft power plant of FIG. 7 taken along line 8-8 in FIG. 7.

FIG. 8 is cross-sectional view of the aft portion of the hybrid aircraft power plant of FIG. 7 taken along line 8-8 in FIG. 7. FIG. 8 shows the engagement(s) between inner wall 254 and outer wall 256 at the locations where first branch 240 passes through outer wall 256, and where second branch 242 passes through outer wall 256. The engagements may serve to brace first branch 240 and second branch 242 with outer wall 256 to increase the overall stiffness of exhaust duct 238. In some embodiments, the engagements (e.g., contact interfaces) may extend completely around first branch 240 and second branch 242.

Figure 9:
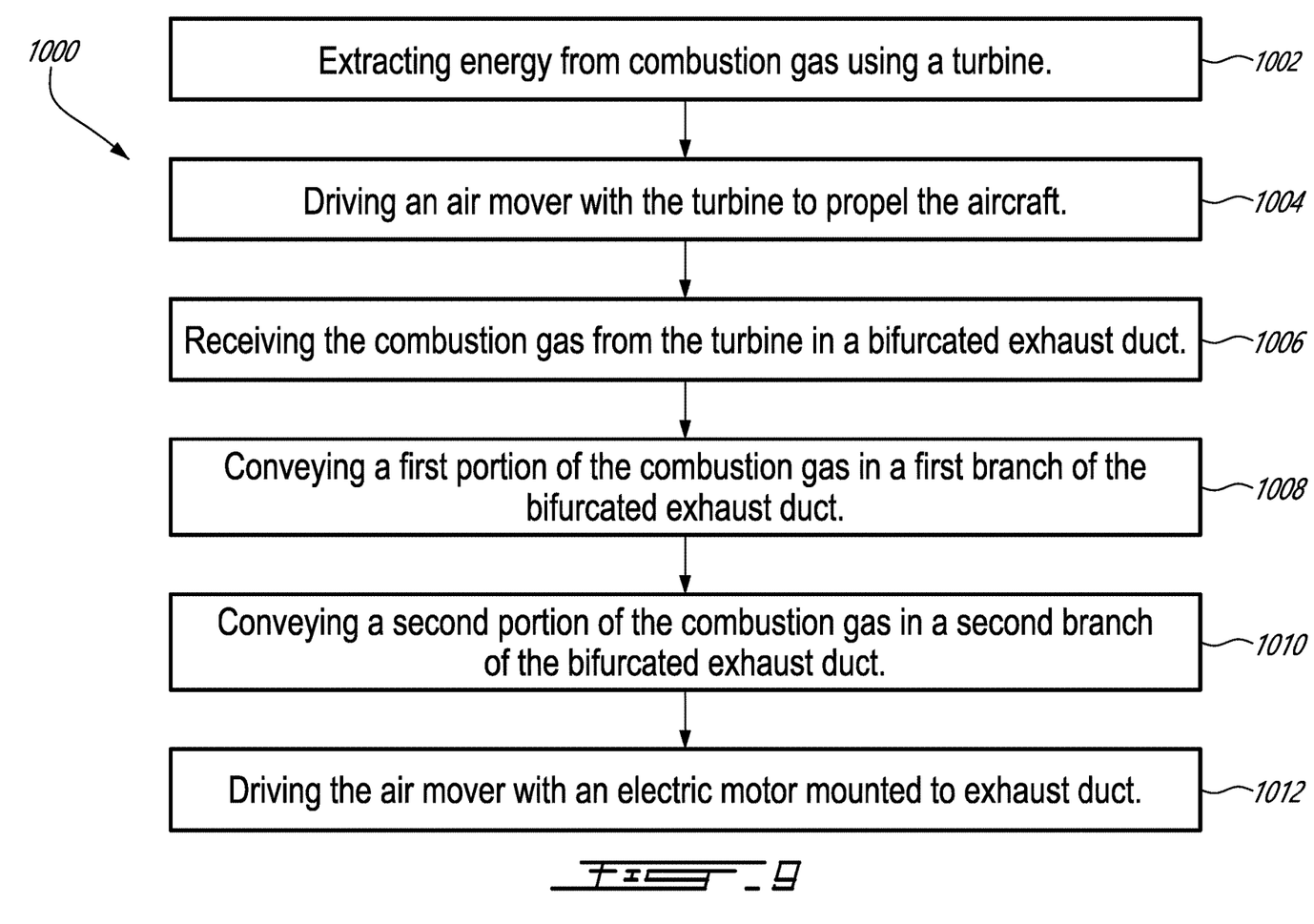
FIG. 9 is a flow diagram of a method of operating a hybrid power plant of an aircraft.

FIG. 9 is a flow diagram of a method 1000 of operating power plant 10 or other hybrid aircraft power plants. Method 1000 may be performed using any one of exhaust ducts 38, 138 and 238. Method 1000 may include elements of power plant 10 and of exhaust ducts 38, 138 and 238. In various embodiments, method 1000 may include:

- extracting energy from combustion gas using a turbine such as low-pressure turbine 30 (block 1002);
- driving an air mover such as propeller 24 with low-pressure turbine 30 to propel aircraft 12 (block 1004);
- receiving the combustion gas from low-pressure turbine 30 in bifurcated exhaust duct 38, 138, 238 (block 1006);
- conveying a first portion of the combustion gas in first branch 40, 140, 240 of exhaust duct 38, 138, 238 (block 1008);
- conveying a second portion of the combustion gas in a second branch 42, 142, 242 of exhaust duct 38, 138, 238 (block 1010); and
- driving propeller 24 with an electric motor such as electric machine 46 mounted to exhaust duct 38, 138, 238 (block 1012).

In some embodiments, electric machine 46 may be disposed between first branch 40 and second branch 42 and axially overlap first branch 40 and second branch 42 relative to turbine axis TA. Electric machine 46 may be coaxial with low-pressure turbine 30. In some embodiments, electric machine 46 may be in torque-transmitting engagement with low-pressure turbine 30 so that driving propeller 24 with electric machine 46 may also include driving low-pressure turbine 30 with electric machine 46.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A hybrid aircraft power plant comprising:
an air mover for propelling an aircraft;
a gas turbine engine operable to drive the air mover, the gas turbine engine including:
 a turbine extracting energy from an annular stream of combustion gas, the turbine being rotatable about a rotation axis;
 a bifurcated exhaust duct receiving the annular stream of the combustion gas from the turbine, the bifurcated exhaust duct including: a first branch conveying a first portion of the combustion gas toward a first direction away from the rotation axis of the turbine; and a second branch conveying a second portion of the combustion gas toward a second direction away from the rotation axis, the second direction being different from the first direction; and
an electric motor mounted to the bifurcated exhaust duct and operable to drive the air mover via the turbine,
wherein the bifurcated exhaust duct is at least partially double-walled and includes: an inner wall conveying the combustion gas; and an outer wall disposed outwardly of the inner wall, the electric motor being mounted to the outer wall.

2. The hybrid aircraft power plant as defined in claim 1, wherein the electric motor is mounted to the bifurcated exhaust duct at a mounting location between the first branch and the second branch.

3. The hybrid aircraft power plant as defined in claim 1, wherein the electric motor includes a rotor rotatable about the rotation axis of the turbine.

4. The hybrid aircraft power plant as defined in claim 1, wherein:

the outer wall defines a mounting interface for the electric motor; and the mounting interface defines a socket receiving part of the electric motor.

5. The hybrid aircraft power plant as defined in claim 1, wherein:

the outer wall defines a mounting interface for the electric motor; and the electric motor is fastened to the mounting interface.

6. The hybrid aircraft power plant as defined in claim 1, wherein the first branch and the second branch are at diametrically opposed positions relative to the rotation axis of the turbine.

7. The hybrid aircraft power plant as defined in claim 1, wherein:

the inner wall defines the first branch and the second branch;

the first branch extends through a first opening formed through the outer wall; and the second branch extends through a second opening formed through the outer wall.

8. The hybrid aircraft power plant as defined in claim 7, wherein the first opening through the outer wall and the second opening through the outer wall are diametrically opposed relative to the rotation axis of the turbine.

9. The hybrid aircraft power plant as defined in claim 7, wherein the first opening through the outer wall and the second opening through the outer wall are non-diametrically opposed relative to the rotation axis of the turbine.

10. The hybrid aircraft power plant as defined in claim 7, wherein the first branch of the inner wall and the first opening through the outer wall are sized to define a gap between the first branch and the first opening, the gap extending completely around the first branch.

11. The hybrid aircraft power plant as defined in claim 7, wherein:

the first branch is engaged with the outer wall at the first opening; and the second branch is engaged with the outer wall at the second opening.

12. The hybrid aircraft power plant as defined in claim 7, wherein:

the outer wall defines a mounting interface for the electric motor;

the mounting interface is disposed between the first branch and the second branch;

the electric motor is fastened to the mounting interface; and the electric motor is coaxial with the rotation axis of the turbine.

13. The hybrid aircraft power plant as defined in claim 1, wherein:

the electric motor is mounted between the first branch and the second branch;

the electric motor is coaxial with the turbine; and the electric motor is in torque-transmitting engagement with the turbine via a shaft that is coaxial with the turbine.

14. An aircraft power plant for propelling an aircraft, the aircraft power plant comprising:

a propeller for propelling the aircraft;

a compressor for pressurizing air;

a combustor in which the pressurised air is mixed with fuel and ignited for generating combustion gas;

a turbine for extracting energy from combustion gas, the turbine being in torque-transmitting engagement with the propeller;

a bifurcated exhaust duct for receiving the combustion gas from the turbine, the bifurcated exhaust duct including: a first branch for conveying a first portion of the combustion gas; and a second branch for conveying a second portion of the combustion gas; and an electric machine mounted to the bifurcated exhaust duct and in torque-transmitting engagement with the turbine, wherein:

the electric machine is mounted between the first branch and the second branch;

the electric machine is coaxial with the turbine;

the bifurcated exhaust duct includes: an inner wall defining the first branch and the second branch;

and an outer wall covering part of the inner wall;

the first branch and the second branch extend through the outer wall; and the electric machine is mounted to the outer wall.

15. The aircraft power plant as defined in claim 14, wherein the electric machine is in torque-transmitting engagement with the turbine via a shaft that is coaxial with the turbine.

16. A hybrid aircraft power plant comprising:

an air mover for propelling an aircraft;

a gas turbine engine operable to drive the air mover, the gas turbine engine including:

a turbine extracting energy from an annular stream of combustion gas, the turbine being rotatable about a rotation axis;

a bifurcated exhaust duct receiving the annular stream of the combustion gas from the turbine, the bifurcated exhaust duct including: a first branch conveying a first portion of the combustion gas toward a first direction away from the rotation axis of the turbine; and a second branch conveying a second portion of the combustion gas toward a second direction away from the rotation axis, the second direction being different from the first direction; and an electric motor mounted to the bifurcated exhaust duct and operable to drive the air mover via the turbine, wherein:

the bifurcated exhaust duct includes: an inner wall defining the first branch and the second branch;

and an outer wall disposed outwardly of the inner wall;

the first branch extends through a first opening formed through the outer wall;

the second branch extends through a second opening formed through the outer wall; and the first opening through the outer wall and the second opening through the outer wall are non-diametrically opposed relative to the rotation axis of the turbine.

17. A hybrid aircraft power plant comprising:

an air mover for propelling an aircraft;

a gas turbine engine operable to drive the air mover, the gas turbine engine including:

a turbine extracting energy from an annular stream of combustion gas, the turbine being rotatable about a rotation axis;

a bifurcated exhaust duct receiving the annular stream of the combustion gas from the turbine, the bifurcated exhaust duct including: a first branch conveying a first portion of the combustion gas toward a first direction away from the rotation axis of the turbine; and a second branch conveying a second portion of the combustion gas toward a second direction away from the rotation axis, the second direction being different from the first direction; and an electric motor mounted to the bifurcated exhaust duct and operable to drive the air mover via the turbine, wherein:

the bifurcated exhaust duct includes: an inner wall defining the first branch and the second branch; and an outer wall disposed outwardly of the inner wall;

the first branch extends through a first opening formed through the outer wall;

the second branch extends through a second opening formed through the outer wall;

the first branch of the inner wall and the first opening through the outer wall are sized to define a gap between the first branch and the first opening; and the gap extends completely around the first branch.

* * * * *